US012812083B2

(12) United States Patent
Ma et al.

(10) Patent No.: US 12,812,083 B2
(45) Date of Patent: Nov. 24, 2026

(54) DISPLAY METHOD, SYSTEM, APPARATUS, DEVICE, PROGRAM, AND MEDIUM

(71) Applicant: BOE Technology Group Co., Ltd., Beijing (CN)

(72) Inventors: Xitong Ma, Beijing (CN); Xingxing Zhao, Beijing (CN); Ran Duan, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 279 days.

(21) Appl. No.: 18/704,202

(22) PCT Filed: Aug. 10, 2023

(86) PCT No.: PCT/CN2023/112315

§ 371 (c)(1),
(2) Date: Apr. 24, 2024

(87) PCT Pub. No.: WO2025/030510

PCT Pub. Date: Feb. 13, 2025

(65) Prior Publication Data

US 2026/0164009 A1 Jun. 11, 2026

(51) Int. Cl.
*H04N 13/383* (2018.01)
*H04N 13/117* (2018.01)

(52) U.S. Cl.
CPC ......... *H04N 13/383* (2018.05); *H04N 13/117* (2018.05)

(58) Field of Classification Search
CPC ........................... H04N 13/383; H04N 13/117
See application file for complete search history.

(56) References Cited

U.S. PATENT DOCUMENTS 11,849,098 B2 * 12/2023 Cleveland .............. A61B 5/163
12,423,916 B1 * 9/2025 Sztuk .................... G06T 17/205
2010/0165079 A1 7/2010 Yamada
2012/0050493 A1 * 3/2012 Ernst .................... G02B 27/017 348/47

(Continued)

FOREIGN PATENT DOCUMENTS

CN 204887281 U 12/2015
CN 205665712 U 10/2016

(Continued)

*Primary Examiner* — Fernando Alcon
(74) *Attorney, Agent, or Firm* — WHDA, LLP

(57) ABSTRACT

The present disclosure relates to the technical field of displays, and in particular to a display method, system, apparatus, device, program, and medium. The method includes: acquiring a 3D video signal in response to a frame start signal; processing the 3D video signal according to human eye coordinates sent by a human eye data collection end to obtain left and right eye images; sending and display the left and right eye images on the display end in response to a third trigger signal; generating first and/or second trigger signals according to the third trigger signal, and sending the first and/or second trigger signals to the human eye data collection end so that the human eye data collection end collecting a human eye image in response to the first trigger signal, and performing human eye tracking processing to acquire the human eye coordinates.

11 Claims, 6 Drawing Sheets

(56) References Cited

U.S. PATENT DOCUMENTS

| | | | | |
|---|---|---|---|---|
| 2013/0050432 | A1* | 2/2013 | Perez | G06F 3/011 348/47 |
| 2013/0307855 | A1* | 11/2013 | Lamb | G06F 3/013 345/473 |
| 2014/0225887 | A1* | 8/2014 | Aguirre-Valencia | H04N 13/279 345/419 |
| 2018/0205943 | A1* | 7/2018 | Trail | G06T 7/73 |
| 2019/0222830 | A1* | 7/2019 | Edwin | G02B 27/0081 |
| 2022/0070427 | A1* | 3/2022 | Ha | H04N 13/133 |
| 2022/0201276 | A1 | 6/2022 | Li et al. | |
| 2023/0130892 | A1* | 4/2023 | Li | G06V 40/19 348/54 |
| 2023/0233072 | A1* | 7/2023 | Haimovitch-Yogev | G06T 7/73 351/209 |
| 2024/0121379 | A1* | 4/2024 | Drozdov | H04N 13/302 |
| 2024/0338873 | A1 | 10/2024 | Fukazawa et al. | |
| 2026/0039784 | A1* | 2/2026 | Stoia | G06F 3/013 |

FOREIGN PATENT DOCUMENTS

| | | | |
|---|---|---|---|
| CN | 110072094 | A | 7/2019 |
| CN | 111145361 | A | 5/2020 |
| CN | 112929647 | A | 6/2021 |
| CN | 113542840 | A | 10/2021 |
| CN | 114449250 | A | 5/2022 |
| CN | 216599838 | U | 5/2022 |
| CN | 115733967 | A | 3/2023 |
| KR | 20040000154 | A | 1/2004 |
| WO | 2023/282049 | A1 | 1/2023 |

* cited by examiner

DISPLAY METHOD, SYSTEM, APPARATUS, DEVICE, PROGRAM, AND MEDIUM

FIELD

The present disclosure relate to the technical field of displays, and more particularly, to a display method, system, apparatus, device, program, and medium.

BACKGROUND

Display apparatus used in everyday life generally uses two-dimensional (2D) displays, and cannot intuitively represent information of the depth of field. With the development of computer information technology and display technology, three-dimensional display technology has become a research focus in the display field. Three-dimensional (3D) display technology allows the viewer's left eye and right eye to receive images respectively for the same scene. The position difference caused by the interpupillary distance between the viewer's eyes presents two slightly different images on the retinas of the viewer's left and right eyes. This difference is called "binocular parallax", and the two slightly different images form a pair of "stereoscopic image pairs". The "stereoscopic image pairs" are fused through the visual cortex of the brain to finally form a three-dimensional effect.

Currently, 3D display technologies include two broad categories, the naked eye and the eyeglass. Among them, naked-eye 3D display technology has become a hot research direction in the field of 3D display technology because it does not require viewers to wear 3D glasses and greatly improves user experience.

SUMMARY

The embodiments of the present disclosure provide a display method, system, apparatus, device, program, and medium, and the technical solutions adopted by the embodiments of the present disclosure are as follows:

A first aspect of an embodiment of the present disclosure provides a display method applied to a video data processing end, the method includes:

acquiring a 3D video signal in response to a frame start signal;

processing the 3D video signal according to human eye coordinates sent by a human eye data collection end to obtain left and right eye images;

sending the left and right eye images to a display end to display the left and right eye images on the display end in response to a third trigger signal;

generating a first trigger signal and/or a second trigger signal according to the third trigger signal, and sending the first trigger signal and/or second trigger signal to the human eye data collection end, so that the human eye data collection end collecting a human eye image in response to the first trigger signal, and performing human eye tracking processing based on the human eye image in response to the second trigger signal to acquire the human eye coordinates.

In an optional embodiment of the present application, before processing the 3D video signal, the method further comprises:

performing segmentation processing on the 3D video signal to obtain a first video signal and a second video signal, wherein one of the first video signal and the second video signal is a left-eye video signal corresponding to the 3D video signal, and the other is a right-eye video signal;

acquiring first video data corresponding to the first video signal and time sequence information based on the first video signal, and writing the first video data into a memory over a fifth time period, wherein the fifth time period is half of the time that one frame of the 3D video signal is input;

generating output time sequence information based on the time sequence information, wherein the output time sequence information characterizes the output time sequence of the left and right eye images on the display end.

In an optional embodiment of the present application, generating a second trigger signal according to the third trigger signal comprises:

determining a third moment, wherein the third moment is a moment when the third trigger signal triggers the left and right eye images to be sent to the display end;

acquiring a third time period, reversely delaying the third time period from the third moment, and determining a second moment, wherein the third time period is the time for the human eye data collection end to perform human eye tracking processing on one frame of the human eye image; and generating the second trigger signal based on the second moment, so that the second trigger signal triggers the human eye data collection end to acquire the human eye coordinates at the second moment.

In an optional embodiment of the present application, determining the third moment comprises:

acquiring a first time period, wherein the first time period is the time for inputting one frame of the 3D video signal;

determining the third moment based on the first time period corresponding to the current frame, wherein the third moment is a midpoint moment of the first time period.

In an optional embodiment of the present application, generating a first trigger signal according to the third trigger signal comprises:

acquiring a fourth time period, wherein the fourth time period is the time for the human eye data collection end to collect one frame of the human eye image;

reversely delaying the fourth time period from the second moment to determine a first moment;

generating the first trigger signal based on the first moment, so that the first trigger signal triggers the human eye data collection end to collect the human eye image of the current frame at the first moment.

In an optional embodiment of the present application, generating a first trigger signal according to the third trigger signal comprises:

acquiring a fourth time period, wherein the fourth time period is the time for the human eye data collection end to collect one frame of the human eye image;

determining a fourth moment based on the third time period, wherein the fourth moment is the moment at which the human eye data collection end completes human eye tracking processing on the previous frame of the human eye image;

forward delaying a difference period of the third time period and the fourth time period from the fourth moment to determine a first moment;

generating the first trigger signal based on the first moment, so that the first trigger signal triggers the human eye data collection end to collect the human eye image of the current frame at the first moment.

In an optional embodiment of the present application, generating a second trigger signal according to the third trigger signal and sending the second trigger signal to the human eye data collection end comprises:

determining a first quantity based on the first time period and the third time period;

generating the first quantity of second trigger signals at the second moment, so that the frequency of acquiring the human eye coordinates in response to the first quantity of second trigger signals matches the frequency of acquiring a 3D video signal; and sending the first quantity of second trigger signals successively to a second quantity of human eye tracking subsystems in the human eye data collection end, wherein the second quantity is greater than or equal to the first quantity.

In an optional embodiment of the present application, determining a first quantity based on the first time period and the third time period comprises:

calculating a ratio of the third time period to the first time period, and rounding up the ratio to obtain the first quantity.

In an optional embodiment of the present application, processing the 3D video signal according to human eye coordinates sent by a human eye data collection end comprises:

acquiring second video data based on the second video signal;

reading the first video data from the memory, performing distribution stretching on the first video data and the second video data to obtain left and right video data, wherein the resolution of the left and right video data is the same as that of the 3D video signal; and in response to the human eye coordinates sent by the human eye data collection end, performing pixel rearrangement on the left and right video data based on the human eye coordinates and the output time sequence information and generating the left and right eye images.

In an optional embodiment of the present application, reading the first video data from the memory, performing distribution stretching on the first video data and the second video data to obtain left and right video data comprises:

after the first video data is completely written, reading the first video data over a sixth time period, the sixth time period having the same duration as the fifth time period; and performing distribution stretching on the first video data and the second video data to obtain the left and right video data.

A second aspect of an embodiment of the present disclosure provides a display method, applied to a human eye data collection end, comprising:

collecting a human eye image in response to a first trigger signal sent by a video data processing end;

performing human eye tracking processing on the human eye image in response to a second trigger signal sent by the video data processing end to acquire human eye coordinates; and sending the human eye coordinates to the video data processing end so that the video data processing end processes a 3D video signal based on the human eye coordinates to generate left and right eye images, and sending the left and right eye images to a display end in response to a third trigger signal, wherein the first trigger signal and/or the second trigger signal are/is generated according to the third trigger signal.

In an optional embodiment of the present application, collecting a human eye image in response to a first trigger signal sent by a video data processing end comprises:

receiving the first trigger signal sent by the video data processing end;

controlling an image collection apparatus to collect one frame of the human eye image over a fourth time period in response to the first trigger signal at a first moment; and performing human eye tracking processing on the human eye image in response to a second trigger signal sent by the video data processing end to acquire human eye coordinates, comprises:

receiving the second trigger signal sent by the video data processing end; and performing human eye tracking processing on one frame of the human eye image over a third time period in response to the second trigger signal at a second moment to acquire the human eye coordinates.

In an optional embodiment of the present application, the human eye data collection end comprises a second quantity of human eye tracking subsystems, and receiving the second trigger signal sent by the video data processing end comprises:

receiving a first quantity of the second trigger signals successively sent by the video data processing end within the third time period, wherein the second quantity is greater than or equal to the first quantity; and controlling the eye tracking subsystem to perform human eye tracking processing on the human eye image in response to each of the second trigger signals such that each of the newly received second trigger signals triggers the human eye tracking subsystem that has not triggered within the third time period.

A third aspect of an embodiment of the present disclosure provides a display system, comprising:

a human eye data collection end, used for collecting a human eye image in response to a first trigger signal, performing human eye tracking processing based on the human eye image in response to a second trigger signal to acquire human eye coordinates;

a video data processing end, wherein the video data collection end is communicatively connected to the human eye data collection end, and is used for processing a 3D video signal based on the human eye coordinates to generate left and right eye images, and sending the left and right eye images to a display end in response to a third trigger signal;

the display end communicatively connected to the video data processing end and used for receiving and displaying the left and right eye images;

wherein at least one of the first trigger signal and the second trigger signal is generated according to the third trigger signal.

In an optional embodiment of the present application, the human eye data collection end is configured with a human eye data collection subsystem and a human eye tracking subsystem, and the human eye data collection subsystem is communicatively connected to the human eye tracking subsystem;

the human eye data collection subsystem is used for collecting one frame of the human eye image over a fourth time period in response to the first trigger signal at a first moment;

the human eye tracking subsystem is communicatively connected to the video data processing end, and is used for performing human eye tracking processing on one frame of the human eye image over a third time period in response to the second trigger signal at a second moment to acquire the human eye coordinates;

wherein the difference between the first moment and the second moment is equal to a fourth time period, a difference between the second moment and a third moment is equal to a third time period, and the third moment is a triggering moment of the third trigger signal.

In an optional embodiment of the present application, the video data processing end is configured with a video receiving subsystem, a video post-processing subsystem, and a video sending subsystem;

the video receiving subsystem is used for acquiring the 3D video signal and performing segmentation processing on the 3D video signal to obtain a first video signal and a second video signal;

the video post-processing subsystem is used for generating output time sequence information based on the first video signal, and generating the left and right eye images based on post-processing information, the post-processing information comprising at least one of the following: the human eye coordinates, the first video signal, the second video signal, and the output time sequence information;

the video sending subsystem is used for sending the left and right eye images to the display end at a third moment in response to the third trigger signal.

In an optional embodiment of the present application, the video data processing end generates the first trigger signal in reverse based on the third moment, the third time period, and the fourth time period, so that the first trigger signal triggers the human eye data collection subsystem to collect the human eye image of the current frame at the first moment;

wherein the first moment is used for characterizing the moment at which the human eye data collection subsystem completes a collection of the human eye image of the previous frame.

In an optional embodiment of the present application, the video data processing end generates the first trigger signal in reverse based on the second trigger signal and the fourth time period so that the first trigger signal triggers the human eye data collection subsystem to collect the human eye image of the current frame at the first moment.

In an optional embodiment of the present application, the video data processing end generates the second trigger signal in reverse based on the third moment and the third time period so that the second trigger signal triggers the human eye tracking subsystem to acquire the human eye coordinates of the current frame at the second moment;

wherein the second moment is used for characterizing the moment at which the human eye tracking subsystem completes an acquisition of the human eye coordinates of the previous frame.

In an optional embodiment of the present application, the video data processing end generates the third trigger signal based on a first time period, so that the third trigger signal triggers the video data processing end to send the left and right eye images to the display end at the third moment;

wherein the first time period is used for characterizing the time for which the video data processing end inputs one frame of the 3D video signal.

In an optional embodiment of the present application, the video data processing end determines at least one path of a second trigger signal based on the third moment and the third time period so that the frequency of collection of the human eye image by the human eye tracking subsystem in response to the at least one path of the second trigger signal matches the frequency of acquisition of the 3D video signal by the video data processing end.

In an optional embodiment of the present application, the video post-processing subsystem is used for generating output time sequence information based on the first video signal comprises:

the video post-processing subsystem, based on the first video signal, acquires first video data corresponding to the first video signal and time sequence information, writes the first video data into a memory, and generates the output time sequence information based on the time sequence information.

In an optional embodiment of the present application, the video post-processing subsystem generates the left and right eye images based on post-processing information comprises:

the video post-processing subsystem reads the first video data from the memory, performs distribution stretching on the first video data and second video data corresponding to the second video signal, and performs pixel rearrangement based on the human eye coordinates and the output time sequence information so as to generate the left and right eye images.

In an optional embodiment of the present application, the video post-processing subsystem reads one frame of the first video data and one frame of the second video data from the memory respectively at the same time successively within the time for which the video data processing end inputs one frame of the 3D video signal.

A fourth aspect of an embodiment of the present disclosure provides a display apparatus, applied to a video data processing end, comprising:

a video acquisition module, used for acquiring a 3D video signal in response to a frame start signal;

a video processing module, used for processing the 3D video signal according to human eye coordinates sent by a human eye data collection end to obtain left and right eye images;

a sending module, used for sending the left and right eye images to a display end to display the left and right eye images on the display end in response to a third trigger signal; and a trigger signal module, used for generating a first trigger signal and/or a second trigger signal according to the third trigger signal, and sending the first trigger signal and/or second trigger signal to the human eye data collection end, so that the human eye data collection end collecting a human eye image in response to the first trigger signal, and performing human eye tracking processing based on the human eye image in response to the second trigger signal to acquire the human eye coordinates.

A fifth aspect of an embodiment of the present disclosure provides a display apparatus, applied to a human eye data collection end, comprising:

a human eye collection module, used for collecting a human eye image in response to a first trigger signal sent by a video data processing end;

a human eye tracking module, used for performing human eye tracking processing on the human eye image in response to a second trigger signal sent by the video data processing end to acquire human eye coordinates; and

- a coordinates sending module, used for sending the human eye coordinates to the video data processing end so that the video data processing end processes a 3D video signal based on the human eye coordinates to generate left and right eye images, and sending the left and right eye images to a display end in response to a third trigger signal, wherein the first trigger signal and/or the second trigger signal are/is generated according to the third trigger signal.

A sixth aspect of an embodiment of the present disclosure provides a computing processing device, comprising:

- a memory, in which a computer readable code is stored; and
- one or more processors, when the computer readable code is executed by the one or more processors, the computing processing device performing the display method according to the first aspect or the computing processing device performing the display method according to the second aspect.

A seventh aspect of an embodiment of the present disclosure provides computer program, comprising computer readable code which, when run on a computing processing device, causes the computing processing device to perform the display method according to the first aspect or causes the computing processing device to perform the display method according to the second aspect.

An eighth aspect of an embodiment of the present disclosure provides computer-readable medium, having stored thereon the computer program according to the seventh aspect.

The above description is only an overview of the technical solution. In order to gain a clearer understanding of the disclosed technical means, one may implement it in accordance with the contents of the manual. Furthermore, to make the above and other purposes, features, and advantages of this disclosure more apparent and understandable, specific embodiments of this disclosure are provided below.

BRIEF DESCRIPTION OF THE DRAWINGS

In order to provide a clearer explanation of the technical solutions in the embodiments or related technologies disclosed herein, a brief introduction to the drawings needed for the description of the embodiments or related technologies will be provided below. It is evident that the drawings described below represent some embodiments of the present disclosure. For those skilled in the art, additional drawings can be derived from these drawings without exercising inventive labor.

DETAILED DESCRIPTION

To provide a clearer understanding of the objectives, technical solutions, and advantages of the embodiments disclosed herein, the technical solutions in the embodiments will be described clearly and comprehensively in conjunction with the accompanying drawings. It is evident that the described embodiments represent only a portion of the embodiments disclosed herein, rather than all possible embodiments. Based on the embodiments disclosed herein, all other embodiments obtained by those skilled in the art without exercising inventive labor fall within the scope of protection of the present disclosure.

Display apparatus used in everyday life generally uses two-dimensional (2D) displays, and cannot intuitively represent information of the depth of field. With the development of computer information technology and display technology, three-dimensional display technology has become a research focus in the display field. Three-dimensional (3D) display technology allows the viewer's left eye and right eye to receive images respectively for the same scene. The position difference caused by the interpupillary distance between the viewer's eyes presents two slightly different images on the retinas of the viewer's left and right eyes. This difference is called "binocular parallax", and the two slightly different images form a pair of "stereoscopic image pairs". The "stereoscopic image pairs" are fused through the visual cortex of the brain to finally form a three-dimensional effect.

Currently, 3D display technologies include two broad categories, the naked eye and the eyeglass. Since the naked-eye 3D display technology does not require the viewer to wear 3D glasses, the eyeball coordinates of the viewer are collected in real-time by the image collection apparatus, and the pixels of the display terminal are controlled to be turned on or off in a time sequence manner by the eyeball coordinates of the left and right eyes so as to enable the viewer to generate a stereoscopic effect on the display picture seen by the display terminal, the naked-eye 3D display technology can greatly improve the user experience, and has become a hot research direction in the field of 3D display technology.

However, in the application scenario of the naked-eye 3D display technology, there is a long and non-fixed delay from the collection of a human eye image by an image collection apparatus to the viewing of a 3D display picture by a viewer at a display terminal, the time delay being due to an asynchronous delay caused by asynchronous triggering between different modules of the naked-eye 3D display system. The existence of the asynchronous delay makes the real-time of the naked-eye 3D display technology decline, and cannot realize the real-time tracking of the naked-eye 3D display effect, which greatly reduces the user's experience.

Figure 1:
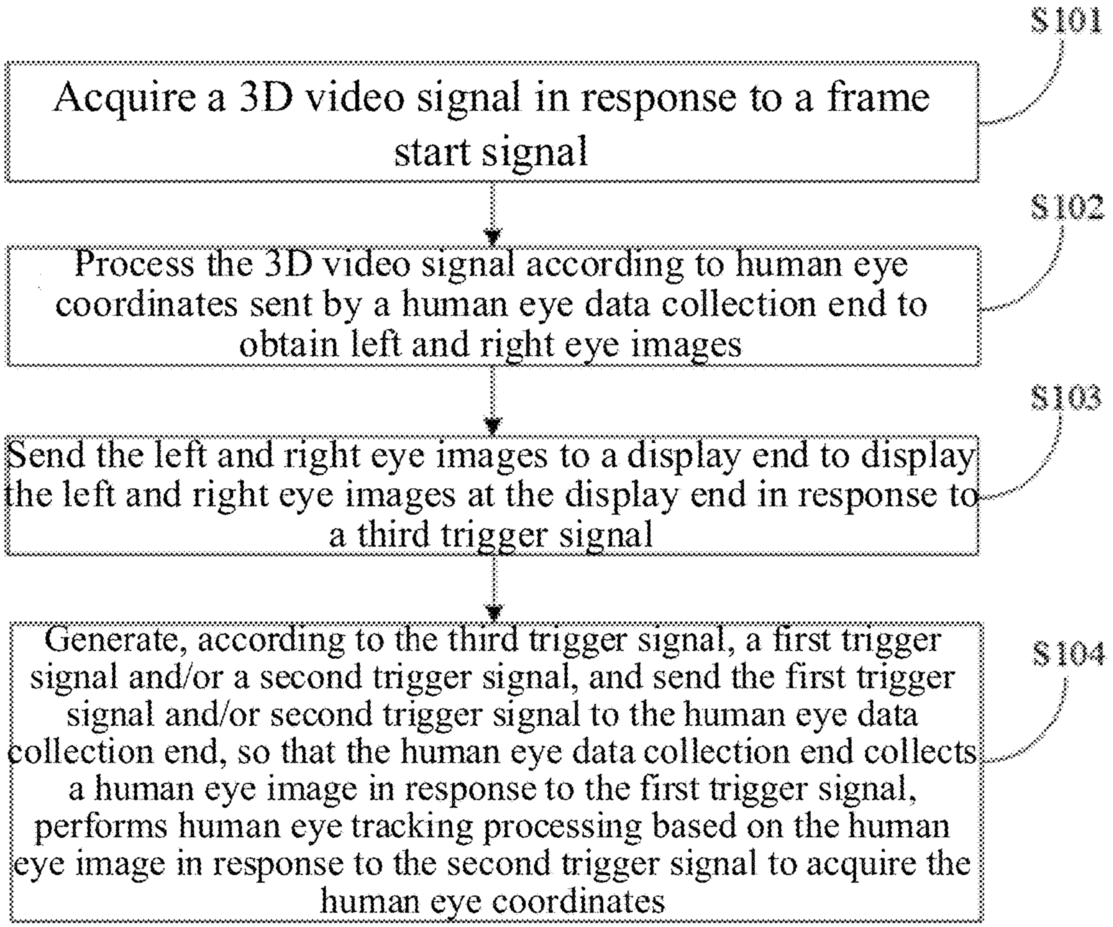
FIG. 1 schematically shows a flow chart of a display method applied to a video data processing end for performing the method according to the present disclosure.

In view of this, an embodiment of the present disclosure provides a display method applied to a video data processing end, and FIG. 1 schematically shows a flow chart of a display method applied to a video data processing end for performing a method according to the present disclosure, as shown in FIG. 1, the method including:

S101, acquiring a 3D video signal in response to a frame start signal.

S102, processing the 3D video signal according to human eye coordinates sent by a human eye data collection end to obtain left and right eye images.

S103, sending the left and right eye images to a display end to display the left and right eye images on the display end in response to a third trigger signal.

S104, generating a first trigger signal and/or a second trigger signal according to the third trigger signal, and sending the first trigger signal and/or second trigger signal to the human eye data collection end, so that the human eye data collection end collecting a human eye image in response to the first trigger signal, performing human eye tracking processing based on the human eye image in response to the second trigger signal to acquire the human eye coordinates.

In the embodiments of the present disclosure, the video data processing end is a system for performing video processing on a 3D video signal to obtain left and right eye images for display on a display end, and the human eye data collection end is a system for performing processing on a human eye image to acquire human eye coordinates for generating the left and right eye images. Wherein the 3D video signal is a video signal acquired by a video data processing end from a server, and the server can be a local server and can also be a cloud server; the 3D video signal includes video data and time sequence information corresponding to the video data, and the format of the 3D video signal can be a common format of a 3D video signal, for example, it can be Side by Side, Top and Bottom and Interlaced, etc. It should be noted that the format of the 3D video signal can be determined according to practical situations, and the present disclosure is not particularly limited herein.

In the disclosed embodiment, the frame start signal is a start signal for processing a 3D video signal of each frame, and is used for triggering the video processing flow of the 3D video signal of the current frame after the video processing flow of the 3D video signal of the previous frame ends; and since the frequency of the server sending the 3D video signal of each frame to the video data processing end is fixed, at the start moment of each frame, the frame start signal is triggered with the sending frequency of the 3D video signal of each frame being fixed.

The human eye coordinates is a coordinate of a human eye image in a human face image collected in real-time by a human eye data collection end in a specified coordinate system; the specified coordinate system can be an image coordinate system or a pixel coordinate system corresponding to an image collection apparatus in a human eye data collection subsystem, etc.; the human eye coordinates are used for determining pixel offset values of left and right eyes via the human eye coordinates when processing a 3D video signal, so as to real-time correct the process of pixel rearrangement when generating a left-eye image and a right-eye image for each frame of the video signal based on the human eye coordinates; promoting the naked eye 3D display effect when the left and right eye images corresponding to the 3D video signal are displayed on the display end. the left and right eye images are a combined image of a left eye image and a right eye image, wherein the left eye image and the right eye image are 2D views and are combined into the left and right eye images in a 3D format so that when the left and right eye images are displayed on the display end, the left eye image and the right eye image are respectively sent to the left eye and the right eye of a viewer according to a pre-set output time sequence, so as to realize naked eye 3D display.

In the disclosed embodiment, the display end is used for displaying the left and right eye images on the screen in a time sequence so that the left and right eyes of the viewer receive the left eye image and the right eye image, respectively, thereby realizing the naked eye 3D display. The display end may be an apparatus with a display function, may be a display, or a product including a display, wherein the display may be a Flat Panel Display (FPD), a large display, or a micro display, etc. The display may be a transparent display or an opaque display if divided according to whether the user can see the scene behind the display. It should be noted that the specific display apparatus can be determined according to actual situations, and the present disclosure is not limited herein.

Figure 2:
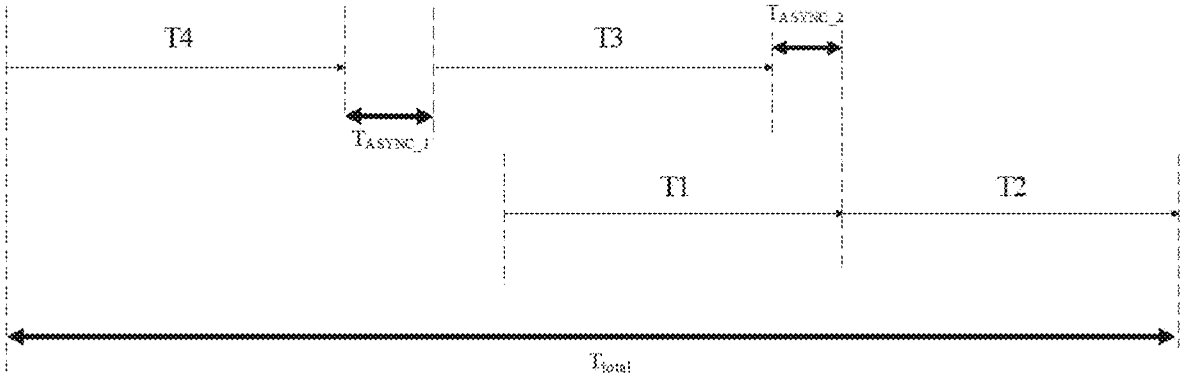
FIG. 2 schematically shows the end-to-end system delay diagram in the prior art.

There is an end-to-end asynchronous delay in the existing naked eye 3D display system, and FIG. 2 schematically shows an end-to-end system delay diagram in the prior art, wherein in FIG. 2, T4 represents a time period required for an image collection apparatus to collect one frame of a human eye image, T3 represents a time period required for performing human eye tracking processing on the human eye image to acquire corresponding human eye coordinates, T2 represents a response time period for a display end to receive left and right eye images for display on a screen, and T1 represents a time period required for a server to input one frame of a 3D video signal to a video data processing end. As shown in FIG. 2, in an existing processing flow for each frame of a 3D video signal, firstly, a human eye image of a current frame is acquired via an image collection apparatus through a duration of T4; after acquiring the human eye image, human eye tracking processing is performed on the human eye image through a duration of T3 to obtain human eye coordinates corresponding to the human eye image; and since the human eye tracking processing is not accurately triggered at the same time as the end of acquiring the human eye image, after obtaining the human eye image, there is a first asynchronous delay before performing human eye tracking processing on the human eye image, namely, $T_{ASYNC\_1}$ shown in FIG. 2. The first asynchronous delay has a duration range greater than or equal to zero and less than or equal to T4. On the other hand, in the process of performing human eye tracking processing on a human eye image, a video data processing end starts to receive a 3D video signal sent by a server, completes receiving the 3D video signal after the duration of T1, then performs video processing on the 3D video signal based on human eye coordinates after the duration of T2, obtains left and right eye images and sends same to a display end, and completes naked-eye 3D display of one frame of the 3D video signal; and since performing video processing on the 3D video signal needs to be corrected based on human eye coordinates, the moment at which the acquisition of the human eye coordinates and the 3D video signal ends cannot be unified. This results in a second asynchronous delay between the human eye tracking process and the left and right eye image output, i.e. $T_{ASYNC\_2}$ shown in FIG. 2, having a duration range greater than or equal to 0 and less than or equal to T3. Therefore, with the existing naked-eye 3D display system, the total length of video processing for each frame (from collecting the human eye image starting at each frame to the left and right eye images displayed at the viewer receiving display end) is extended due to the presence of the first asynchronous delay and the second asynchronous delay. Wherein the total video processing duration of each frame can be represented by the following formula:

$$T_{total}=T4+T_{ASYNC\_1}+T3+T_{ASYNC\_2}+T2$$

Wherein $T_{total}$ is the total video processing duration of each frame; T4 is the time period required for the image collection apparatus to collect one frame of human eye image; T3 is the time period required for performing human eye tracking processing on a human eye image to acquire corresponding human eye coordinates; T2 is a response time period during which a display end receives left and right eye images for display on a screen; $T_{ASYNC\_1}$ is the first asynchronous delay; $T_{ASYNC\_2}$ is the second asynchronous delay.

In the embodiment of the present disclosure, the third trigger signal is used for triggering the video data processing end to send the generated left and right eye images to the display end in the processing flow of each frame of the 3D video signal. In the embodiment of the present disclosure, since the time and frequency for the server to input one frame of the 3D video signal are fixed, and the time for the video data processing end to send the generated left and right eye images to the display end (namely, the trigger moment of the third trigger signal) is directly related to the time for the server to input one frame of the 3D video signal, it can be based on the trigger moment of the third trigger signal. The trigger moment of the human eye tracking and the trigger moment of the human eye image collection in the processing of the 3D video signal of the frame corresponds to the trigger moment of the human eye tracking and the human eye image collection in the processing of the 3D video signal of the previous frame, so that in the processing of the 3D video signal, while the human eye tracking and the human eye image collection of the previous frame ends, the human eye tracking and the human eye image collection of the current frame are triggered on time, thereby eliminating the asynchronous delay in the naked-eye 3D display system.

Wherein the second trigger signal is a trigger signal generated based on a third trigger signal, the trigger moment of the second trigger signal is earlier than the third trigger signal, and is a trigger signal used for on-time triggering the current frame to perform human eye tracking processing on a human eye image while the human eye tracking of the previous frame ends, and accurately triggering the processing on a 3D video signal while the current frame generates human eye coordinates, thereby eliminating a second asynchronous delay; the first trigger signal is a trigger signal generated based on a third trigger signal, the trigger moment of the first trigger signal is earlier than that of the second trigger signal and the third trigger signal and is a trigger signal used for on-time triggering the current frame to perform human eye image collection while the human eye image collection of the previous frame ends, so as to eliminate a first asynchronous delay. The present disclosure generates a second trigger signal and/or a second trigger signal through a reverse delay of a third trigger signal, so as to accurately trigger the human eye tracking processing of the current frame when the human eye tracking processing of the previous frame ends through the second trigger signal, and accurately trigger the processing of a 3D video signal while enabling the current frame to generate human eye coordinates, and accurately trigger the human eye image collection of the current frame when the human eye image collection of the previous frame ends through the first trigger signal, eliminating the first asynchronous delay and the second asynchronous delay, effectively reducing the end-to-end delay of the naked eye 3D display system, and improving the user experience.

Figure 5:
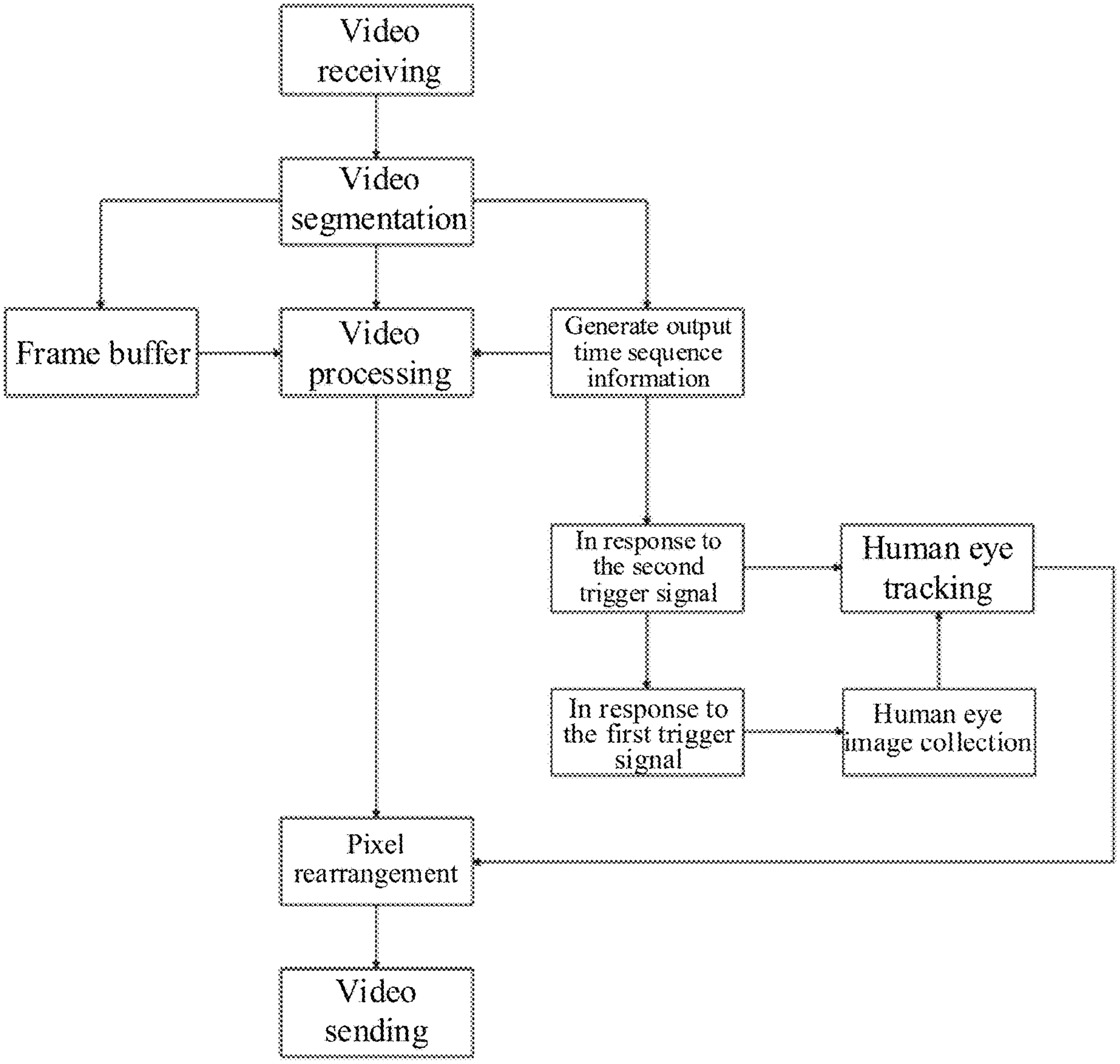
FIG. 5 schematically shows a flow chart of a display method for performing the method according to the present disclosure.

In order to enable a person skilled in the art to better understand the technical solution of the present disclosure, FIG. 5 schematically shows a flow chart of a display method for performing the method according to the present disclosure, and in conjunction with FIG. 5, the flow of the steps of the display method applied to a video data processing end provided by the present disclosure is described in detail as follows:

- when step S101 is specifically implemented, after the video processing flow of the 3D video signal of the previous frame ends, the video data processing end generates a frame start signal of the current frame, and in response to the frame start signal of the current frame, acquires the 3D video signal of the current frame from a server which establishes a connection, wherein the video data processing end establishes a connection with the server via a video interface, and the video interface can be a HDMI interface, a SDI interface, a VGA interface, a DVI interface, etc. and the specific video interface can be determined according to actual situations, and the present disclosure does not limit this.

Wherein in response to the frame start signal of the current frame, the video data processing end acquires one frame of the 3D video signal from the server via a first time period, and since the frequency of the server sending each frame of the 3D video signal to the video data processing end is fixed, the time period between two consecutive frames of the sent 3D video signal is the first time period, and the period of the first time period is also fixed. Illustratively, the frequency at which the server sends each frame of the 3D video signal to the video data processing end is 60 frames per second, and the first time period is the time for which the server sends two adjacent frames of the 3D video signal to the video data processing end.

In an alternative embodiment, since the left and right eye images finally output on the display end need to be output according to the corresponding timing so that the left and right eyes of the viewer respectively receive different images so as to see an image having a stereoscopic effect on the display end, after acquiring the 3D video signal, the 3D video signal needs to be pre-processed to obtain the time sequence information on which the image is displayed based on the 3D video signal. Specifically, since a 3D video signal is a video signal formed by combining 2D video signals in different combinations, the segmentation processing is performed on the 3D video signal to obtain a first video signal and a second video signal, and the first video signal and the second video signal maintain the same resolution in the 3D video signal, the resolution of the first video signal and the second video signal is less than the resolution of the 3D video signal. One of the first video signal and the second video signal is a left-eye video signal corresponding to the 3D video signal, and the other is a right-eye video signal, for example, the first video signal is a left-eye video signal, and the second video signal is a right-eye video signal; alternatively, the first video signal is a right-eye video signal and the second video signal is a left-eye video signal.

Since both the first video signal and the second video signal contain corresponding video data and time sequence information corresponding to the video data, the time sequence information can be used to generate output time sequence information for outputting left and right eye images on the display end to achieve a naked eye 3D effect, either one of the first video signal and the second video signal is selected for acquiring the output time sequence information, and after acquiring the output time sequence information, subsequent video post-processing is performed together with the other one to acquire left and right eye images for output to the display end.

Wherein the output time sequence information can be acquired via a first video signal, and the output time sequence information can also be acquired via a second video signal, and the process thereof is identical; next, taking the first video signal as an example, the process of acquiring the output time sequence information of the present disclosure is described as follows: firstly, based on the first video signal, first video data corresponding to the first video signal and time sequence information are acquired, and the time sequence information characterizes the output time sequence of the first video data in the 3D video signal. Subsequently, writing the first video data into a memory to perform frame buffering, and based on the time sequence information about the first video data, generating output time sequence information about the left and right eye images output on the display end.

In the embodiment of the present disclosure, in the process of acquiring a 3D video signal of a current frame and acquiring output time sequence information based on a first video signal obtained by the segmentation of the 3D video signal, since the second video signal is not subjected to pre-processing at this time, a first time period is equally divided into two parts, the writing of the first video data is completed over a fifth time period before the midpoint moment of the first time period, and the time when the writing of the first video data is completed is taken as a third moment, wherein the fifth time period is half of the time foe which one frame of the 3D video signal is input. At this time, the pre-processing process of the current frame for the 3D video signal ends, and in response to a third trigger signal, the post-processing process of the 3D video signal is triggered at a third moment until the left and right eye images are sent to the display end. That is to say, in the present disclosure, since the first video data will only complete reading in the first half of the first time period (namely, the fifth time period) at each frame, the trigger moment of the third trigger signal may also be determined by the duration of the forward delay of the fifth time period at the frame start moment or the midpoint moment of the first time period can be determined as the trigger moment of the third trigger signal.

When step S102 is specifically implemented, during the acquisition of the 3D video signal by the video data processing end, the human eye data collection end completes the acquisition of the human eye coordinates based on the second trigger signal and the first trigger signal generated by the video data processing end; and after receiving the human eye coordinates sent by the coordinate human eye data collection end and completing the acquisition and pre-processing of the 3D video signal, the 3D video signal is post-processed to obtain the left and right eye images. Specifically, firstly, a video signal which is not subjected to frame buffering is acquired, and video data corresponding thereto is acquired; taking a second video signal as an example, in the case where the output time sequence information is acquired based on a first video signal, the second video signal is a video signal which is not subjected to frame buffering, and second video data corresponding to the second video signal is acquired; subsequently, after first video data is completely written into the memory through a fifth time period, the first video data is read from the memory, and the first video data completes reading from the memory through a sixth time period; and since the process of reading and storing the first video data is symmetrical, the durations of the sixth time period and the fifth time period are the same, both being half the duration of the first time period. Since the resolutions of the first video signal and the second video signal are both less than the resolution of the 3D video signal, after acquiring the first video data and the second video data, distribution stretching needs to be performed on the first video data and the second video data so that the resolutions of the first video data and the second video data are the same as those of the 3D video signal, and the distribution stretched first video data and the second video data are respectively taken as left-eye video data and right-eye video data to obtain left and right video data, wherein since the first video signal is a left-eye video signal corresponding to the 3D video signal and one of the second video signals is a right-eye video signal, one of the distribution stretched first video data and the second video data is left-eye video data and the other is right-eye video data, and corresponds to the first video signal and the second video signal, that is to say, in the case where the first video signal is a left-eye video signal and the second video signal is a right-eye video signal, the distribution stretched first video data is left-eye video data, the second video data is right-eye video data; in the case where the first video signal is a right-eye video signal and the second video signal is a left-eye video signal, the distribution stretched first video data is right-eye video data and the second video data is left-eye video data.

It should be noted that the manner of distribution stretching is determined according to different formats of a 3D video signal in practical situations, and illustratively, in the case where the 3D video signal is in an up-down format, after obtaining first video data and second video data, distribution stretching is performed in a vertical direction to obtain left and right video data with the same resolution as the 3D video signal after distribution stretching. The above example is provided only as an alternative to enable a person skilled in the art to better understand the solution of the disclosure, and the specific distribution stretching mode is not limited herein.

Finally, in response to human eye coordinates sent by the human eye data collection end, respectively performing pixel rearrangement on left and right video data based on an image interleaving algorithm, and determining pixel offset values of left and right eyes based on the human eye coordinates, and correcting a result of the pixel rearrangement with the pixel offset value, so as to improve an naked eye 3D display effect; the left and right eye images are then synthesized according to the output time sequence information.

Figure 3:
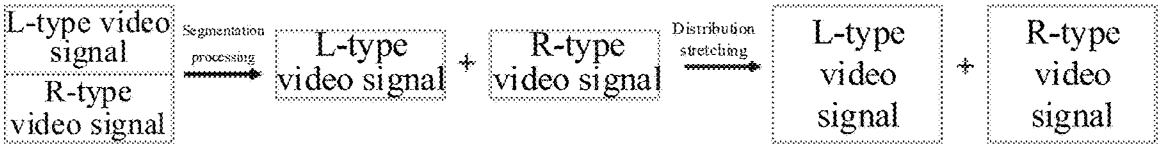
FIG. 3 schematically shows a video pre-processing flow diagram for performing the method according to the present disclosure.

Illustratively, the 3D video signal is a 3D video signal in an up-down format, and FIG. 3 schematically shows a video pre-processing flow diagram for performing the method according to the present disclosure, and as shown in FIG. 3, the 3D video signal has a resolution of 8K4K and includes an L-type video signal and an R-type video signal, and the 3D video signal is subjected to segmentation processing to obtain an L-type video signal and an R-type video signal after segmentation, wherein the resolution of the L-type video signal and the R-type video signal is less than that of the 3D video signal; after acquiring output time sequence information via one of an L-type video signal and an R-type video signal, performing distribution stretching in a vertical direction on first video data corresponding to the L-type video signal and second video data corresponding to the R-type video signal so that the resolution thereof reaches 8K4K, and acquiring left and right video data after the distribution stretching.

When step S103 is specifically implemented, after acquiring the left and right eye images, in response to a third trigger signal triggered at a third moment, sending the left and right eye images to a display end via a second time period, wherein the second time period is used for characterizing the time for which the display end receives and displays the left and right eye images sent by the video data processing end. The display end displays the left and right eye images according to the output time sequence information, and the left and right eyes of the viewer receive corresponding images according to the output time sequence, so as to realize a naked-eye 3D display effect.

Thus, a display flow of one frame of a 3D video signal on the display end is completed, wherein in order to avoid an asynchronous delay from a human eye data collection end to the display end, a first trigger signal, a second trigger signal, and a third trigger signal are provided to trigger a corresponding processing flow at a corresponding moment, wherein the second trigger signal and the first trigger signal determine a trigger moment thereof based on the third trigger signal, and the first trigger signal and/or the second trigger signal are generated according to the third trigger signal via step S104. Wherein step S104 occurs after the generation of the third trigger signal, and before the triggering of the first trigger signal, since the triggering moment of the third trigger signal is determined based on the first time period, and the first time period is fixed, the third trigger signal can be generated at any moment before the third moment and triggered at the third moment.

Figure 4:
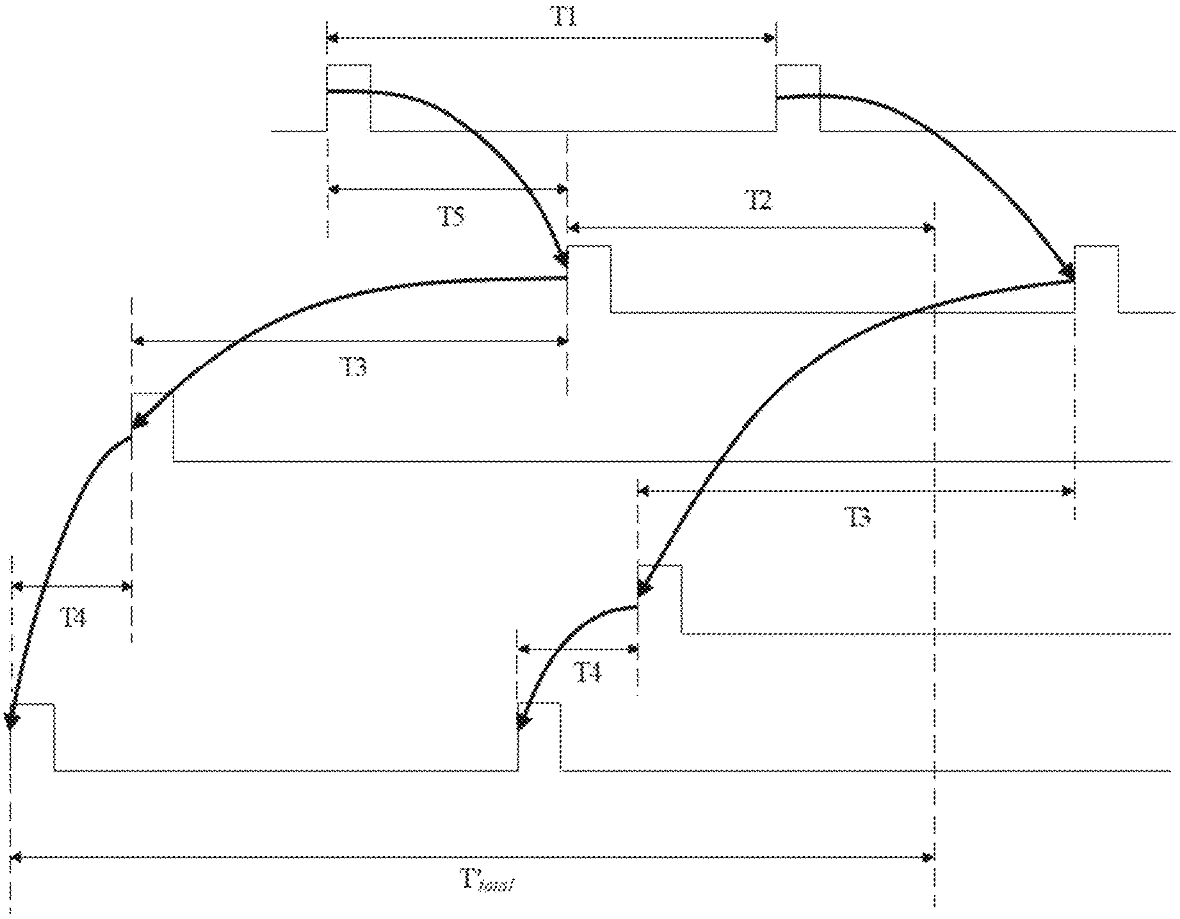
FIG. 4 schematically shows a reverse trigger time sequence diagram for performing the method according to the present disclosure.

In the specific implementation of step S104, FIG. 4 schematically shows a reverse trigger time sequence diagram for performing the method according to the present disclosure, and as shown in FIG. 4, first acquiring the first time period corresponding to the current frame, and determining the moment of the midpoint moment of the first time period as a third moment, wherein the third moment is the moment at which the third trigger signal triggers the left and right eye images to be sent to the display end. In an alternative embodiment, the trigger moment of the third trigger signal may also be determined by the duration of the forward delay of the fifth time period at the frame start moment. Then acquiring, as a third time period, the time for the human eye data collection end to perform human eye tracking processing on one frame of human eye image; since the second trigger signal is triggered earlier than the third trigger signal, in order to ensure that the third trigger signal is triggered at the third moment accurately when the human eye data collection end completes the human eye tracking processing on the human eye image, the third time period is delayed from the third moment in the reverse direction of the time sequence, and the second moment is determined, wherein the second moment is the moment at which the second trigger signal triggers the human eye tracking processing. Finally, the second trigger signal is generated based on the second moment, and the generation of the second trigger signal is not later than the second moment so that the second trigger signal triggers the human eye data collection end to acquire the human eye coordinates on time at the second moment.

The second moment determined by the embodiments of the present disclosure is the moment at which the second trigger signal triggers the human eye tracking processing, and since the second moment is generated based on the third moment reversely delaying the third time period, in the forward time sequence, the human eye data collection end responds to the second trigger signal to trigger the human eye tracking processing at the second moment, completes the human eye tracking processing after the duration of the third time period, and obtains the human eye coordinates; at this moment, after the second moment passes the third time period, the third moment is just reached, and in response to the third trigger signal at the third moment, the video data processing end is triggered to send the left and right eye images to the display end; the second asynchronous delay that would otherwise be between the human eye tracking process and the left and right eye image output is eliminated.

In an alternative embodiment, since the determination of the second moment depends on the third time period and the third moment, and the third moment depends on the duration of acquiring one frame of the 3D video signal, namely, the first time period when the frequency of acquiring one frame of the 3D video signal by the video image processing end does not match the acquisition of the human eye coordinates by the human eye data collection end, naked eye 3D image processing based on human eye coordinates cannot be realized for each frame. At this time, the embodiment of the present disclosure sets a second quantity of human eye tracking subsystems in a human eye data collection end and alternately acquires human eye coordinates so as to realize naked-eye 3D image processing based on human eye coordinates for each frame, wherein the human eye tracking subsystem is a module for performing human eye tracking processing on a human eye image in the human eye data collection end.

Illustratively, the frequency of the video image processing end acquiring one frame of a 3D video signal is 60 times per second, while the processing frequency of a human eye tracking subsystem in the human eye data collection end is only 30 times per second; if there is only one human eye tracking subsystem in the human eye data collection end, the human eye coordinates of the current frame cannot be acquired from one frame of a 3D video signal acquired every second, so in order to avoid this situation, it is ensured that the human eye coordinates of the current frame can be acquired for video processing from each frame; a first human eye tracking subsystem and a second human eye tracking subsystem are provided in a human eye data collection end, wherein the first human eye tracking subsystem acquires human eye coordinates in a current frame, and the second human eye tracking subsystem acquires human eye coordinates in a next frame of the current frame; and the frequency of acquiring the human eye coordinates can be realized by alternately executing the first human eye tracking subsystem and the second human eye tracking subsystem, which matches the frequency of acquiring a 3D video signal.

Specifically, first, based on the first time period and the third time period, a first quantity is determined; since the first time period corresponds to the duration for a video image processing end to collect one frame of 3D video signal, and the third time period corresponds to the duration for a human eye data collection end to acquire the human eye coordinates, based on the first time period and the third time period, the quantity of second trigger signals used for triggering the human eye data collection end to perform human eye tracking processing is acquired as the first quantity; subsequently, generating the first quantity of second trigger signals at the second moment, and sequentially triggering different human eye tracking subsystems to acquire human eye coordinates at the second moment of a corresponding periodic alternating frame via the first quantity of second trigger signals, so that the frequency of collecting the human eye image in response to the first quantity of second trigger signals matches the frequency of acquiring a 3D video signal; finally, sending the first quantity of second trigger signals to a second quantity of human eye tracking subsystems in the human eye data collection end successively, since the human eye tracking subsystems are ensured to be able to trigger the first quantity of second trigger signals, the second quantity is greater than or equal to the first quantity.

Preferably, a ratio of the third time period to the first time period is calculated and the ratio is rounded up to obtain the first quantity. the first quantity is acquired according to the following formula:

$$T'_{total} = T4 + T3 + T2$$

Wherein N is the first quantity, T3 is the duration of the third time period, T1 is the duration of the first time period, and ROUNDUP is a rounding-up function.

In the embodiment of the present disclosure, the first trigger signal is used for triggering the human eye data collection end to perform human eye image collection on the current frame, and the second trigger signal is used for triggering the human eye data collection end to perform human eye tracking processing on the human eye image, and therefore the trigger moment of the first trigger signal is earlier than that of the second trigger signal; and in order to eliminate the first asynchronous delay between the human eye image collection process and the human eye tracking processing, the first trigger signal is generated based on the third trigger signal. Specifically, since the frequency at which the human eye data collection end collects one frame of a human eye image is fixed, firstly acquiring the time at which the human eye data collection end collects one frame of the human eye image, and determining same as a fourth time period; since the first trigger signal is triggered earlier than the second trigger signal, in order to ensure that the second trigger signal is triggered at the second moment when the human eye data collection end completes the collection of the human eye image, the fourth time period is delayed in reverse from the second moment (the second moment is the trigger moment of the second trigger signal determined on the basis of the third trigger signal), and the first moment before the second moment which is the duration of the fourth time period from the second moment is determined, the first moment being the frame when the human eye data collection end is triggered to collect the human eye image in response to the first trigger signal. Finally, the first trigger signal is generated based on the first moment, so that the first trigger signal triggers the human eye data collection end to perform collection of the human eye image on the current frame at the first moment.

In an alternative embodiment, since the frequency of the human eye tracking processing performed by the human eye data collection end is fixed, the first moment can also be determined by means of a forward delay of the moment at which the human eye tracking processing on the last frame of the human eye image is completed. Specifically, a fourth time period is first acquired; then based on the third time period, determining a moment when the human eye data collection end completes the human eye tracking processing on the previous frame of human eye image as a fourth moment; since the fourth moment is earlier than the first moment of the present frame, a difference period between the third time period and the fourth time period is forward delayed from the fourth moment, and a moment which is after the fourth moment and duration of the difference period from the fourth moment is determined as the first moment; finally, the first trigger signal is generated based on the first moment, so that the first trigger signal triggers the human eye data collection end to perform collection of the human eye image on the current frame at the first moment.

The first moment determined by the embodiments of the present disclosure is a moment when a first trigger signal triggers a human eye image collection, and since the first moment is generated based on a second moment reverse delay for a fourth time period, in a forward time sequence, a human eye data collection end responds to the first trigger signal to trigger the human eye image collection at the first moment, completes the human eye image collection of a current frame after the duration of the fourth time period, and obtains a human eye image; at this moment, after the first moment passes the fourth time period, the second moment is just reached, and responds to a second trigger signal at the second moment; triggering a human eye data collection end to perform human eye tracking processing on the human eye image so as to eliminate a first asynchronous delay originally located between human eye image collection and human eye tracking processing.

In the embodiments of the present disclosure, an asynchronous delay from a human eye data collection end to a display end is eliminated based on a first trigger signal, a second trigger signal and a third trigger signal; in a forward time sequence, the human eye data collection end responds to the first trigger signal at a first moment, collects a human eye image of a current frame, completes human eye image collection after a fourth time period, and reaches a second moment; a human eye data collection end responds to a second trigger signal at a second moment, performs human eye tracking processing based on a collected human eye image, completes human eye tracking processing after a third time period, obtains human eye coordinates, and reaches a third moment; in the process of the human eye tracking processing performed by the human eye data collection end, the video data processing end acquires a 3D video signal and performs video processing, completes the acquisition of left and right video data at a third moment, and corrects the left and right video data according to the human eye coordinates simultaneously acquired at the third moment to obtain left and right eye images; in response to the third trigger signal, the video data processing end sends the left and right eye images acquired at the third moment to the display end via the second time period, the display end displays the left and right eye images according to the output time sequence information, and the left and right eyes of the viewer receive corresponding images according to the output time sequence to realize a 3D display effect of naked eyes. The total length of video processing for each frame in embodiments of the present disclosure may be represented by the following formula:

$$T'_{total}$$

Wherein $$N = \text{ROUNDUP}(T3/T1)$$

is the total length of video processing for each frame; T4 is the time period required for the image collection apparatus to collect one frame of human eye image; T3 is the time period required for performing human eye tracking processing on a human eye image to acquire corresponding human eye coordinates; T2 is a response time period in which the display end receives left and right eye images for display on the screen.

An embodiment of the present disclosure provides a display method applied to a video data processing end, the method including: acquiring a 3D video signal in response to a frame start signal; processing the 3D video signal according to human eye coordinates sent by a human eye data collection end to obtain left and right eye images; sending the left and right eye images to a display end to display the left and right eye images on the display end in response to a third trigger signal; generating a first trigger signal and/or a second trigger signal according to the third trigger signal, and sending the first trigger signal and/or second trigger signal to the human eye data collection end, so that the human eye data collection end collecting a human eye image in response to the first trigger signal, and performing human eye tracking processing based on the human eye image in response to the second trigger signal to acquire the human eye coordinates.

The embodiments of the present disclosure provide a first trigger signal and/or a second trigger signal generated on the basis of a reverse delay of a third trigger signal, ensuring that human eye coordinates acquisition is accurately triggered at the end of human eye image acquisition, and video processing is accurately completed and left and right eye images are sent to a display end at the end of human eye coordinates acquisition, thereby eliminating an asynchronous delay existing in each frame video processing, reducing an end-to-end system delay, and improving the display effect of naked eye 3D and the experience of a user.

Figure 6:
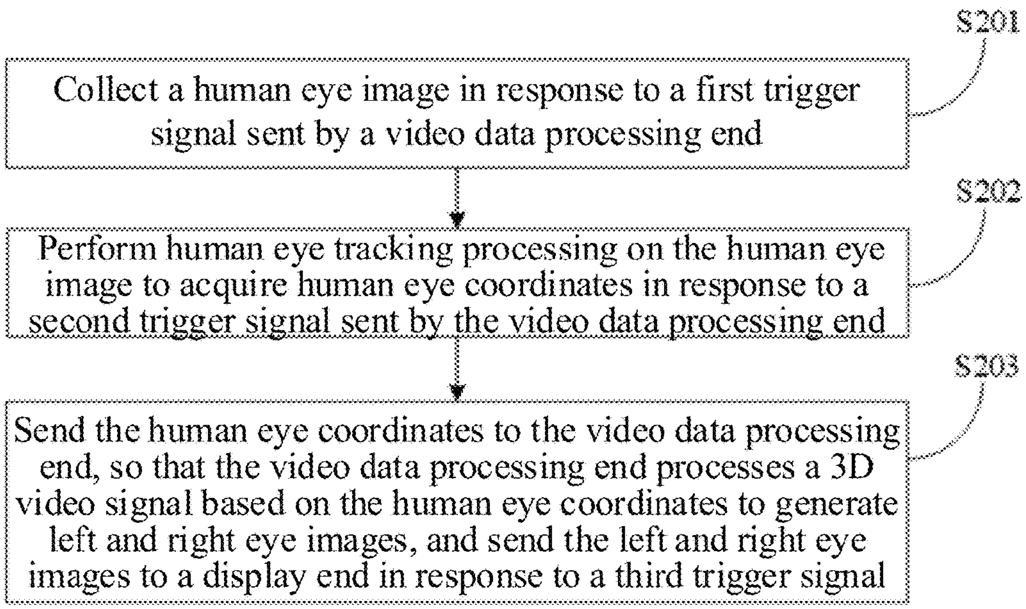
FIG. 6 schematically shows a flow chart of a display method applied to a human eye data collection end for performing the method according to the present disclosure.

Based on the same inventive concept, an embodiment of the present disclosure provides a display method applied to a human eye data collection end, and FIG. 6 schematically shows a flow chart of a display method applied to a human eye data collection end for executing a method according to the present disclosure, as shown in FIG. 6, the method including:

S201, a human eye image is collected in response to a first trigger signal sent by a video data processing end.

S202, human eye tracking processing is performed on the human eye image to acquire human eye coordinates, in response to a second trigger signal sent by the video data processing end.

S203, the human eye coordinates are sent to the video data processing end, so that the video data processing end processes a 3D video signal based on the human eye coordinates to generate left and right eye images, and the left and right eye images are sent to a display end in response to a third trigger signal.

sending the human eye coordinates to the video data processing end so that the video data processing end processes a 3D video signal based on the human eye coordinates to generate left and right eye images, and sending the left and right eye images to a display end in response to a third trigger signal, wherein the first trigger signal and/or the second trigger signal are/is generated according to the third trigger signal.

When step S201 is specifically implemented, the first trigger signal sent by the video data processing end is received, the first trigger signal is generated based on the third trigger signal, and the generated time is not later than the moment at which the human eye data collection end performs human eye image collection on the current frame (namely, a first moment), and after the first trigger signal is generated, the first trigger signal is sent from the video data processing end to the human eye data collection end. Here, with regard to the determination process of the first moment, reference can be made to step S104 in the above-mentioned display method applied to the video data processing end, and the embodiment of the present disclosure will not be described in detail herein. After the first moment is determined since the acquired first trigger signal is not later than the first moment, the image collection apparatus can be controlled to collect one frame of the human eye image over a fourth time period in response to the first trigger signal at the first moment, wherein the fourth time period is the time for the human eye data collection end to collect one frame of the human eye image, and the image collection apparatus can be a target recognition camera or an infrared camera, and can also be other devices having a pattern collection function and a target recognition function. Illustratively, in response to the first trigger signal, a human eye image is acquired from the face image by the object recognition camera acquiring a face image and performing object recognition. It should be noted that the above-mentioned example is merely an alternative way for a person skilled in the art to better understand the method of the present disclosure, and the specific process of acquiring a human eye image based on an image collection apparatus can be determined according to actual situations, and the present disclosure is not limited herein.

When step S202 is specifically implemented, the second trigger signal sent by the video data processing end is received, the second trigger signal is generated based on the third trigger signal, and the generated time is not later than the moment at which the human eye data collection end performs human eye tracking processing on the human eye image of the current frame (namely, a second moment), and after the second trigger signal is generated, the second trigger signal is sent from the video data processing end to the human eye data collection end. Here, with regard to the determination process of the second moment, reference can be made to step S104 in the above-mentioned display method applied to the video data processing end, and the embodiment of the present disclosure will not be described in detail herein. After the second moment is determined, since the acquired second trigger signal is not later than the second moment, the image collection apparatus can be controlled to perform human eye tracking processing on the human eye image via a third time period to obtain human eye coordinates at the second moment in response to the second trigger signal, wherein the third time period is the time for the human eye data collection end to perform human eye tracking processing on the human eye image, and the human eye data collection end acquires the human eye coordinates in the human eye image in a pre-set coordinate system (such as image coordinates corresponding to the image collection apparatus).

In an alternative embodiment, when there is a mismatch between the frequency at which the video image processing end acquires one frame of a 3D video signal and the acquisition of the human eye coordinates by the human eye data collection end, naked-eye 3D image processing based on human eye coordinates cannot be realized for each frame. At this time, the embodiment of the present disclosure sets a second quantity of human eye tracking subsystems in the human eye data collection end and alternately acquires human eye coordinates so as to implement naked eye 3D image processing based on human eye coordinates for each frame. Specifically, first receiving a first quantity of the second trigger signals successively sent by the video data processing end during the third time period, wherein the second quantity is greater than or equal to the first quantity; controlling the eye tracking subsystem to perform human eye tracking processing on the human eye image in response to each of the second trigger signals such that each of the newly received second trigger signals triggers the human eye tracking subsystem that has not triggered within the third time period.

Illustratively, the frequency of the video image processing end acquiring one frame of 3D video signal is 60 times per second, the processing frequency of a human eye tracking subsystem in a human eye data collection end is 20 times per second, at this moment, it is determined that the first quantity is three, and the video data processing end generates three second trigger signals to send same to the human eye data collection end; the human eye data collection end is provided with at least three human eye tracking subsystems (a first human eye tracking subsystem, a second human eye tracking subsystem and a third human eye tracking subsystem), wherein the first human eye tracking subsystem responds to a second trigger signal at a second moment, and performs human eye tracking processing on a human eye image over ⅓ duration of a third time period to obtain first human eye coordinates; a second human eye tracking subsystem responds to another second trigger signal after the first human eye tracking subsystem processing ends, and performs human eye tracking processing on a human eye image over ⅓ duration of a third time period to obtain a second human eye coordinates; the third human eye tracking subsystem responds to the last second trigger signal after the second human eye tracking subsystem processing ends, performs human eye tracking processing on a human eye image over ⅓ duration of a third time period to obtain third human eye coordinates, and at this time, a complete third time period passes from the second moment to reach the third moment.

Figure 7:
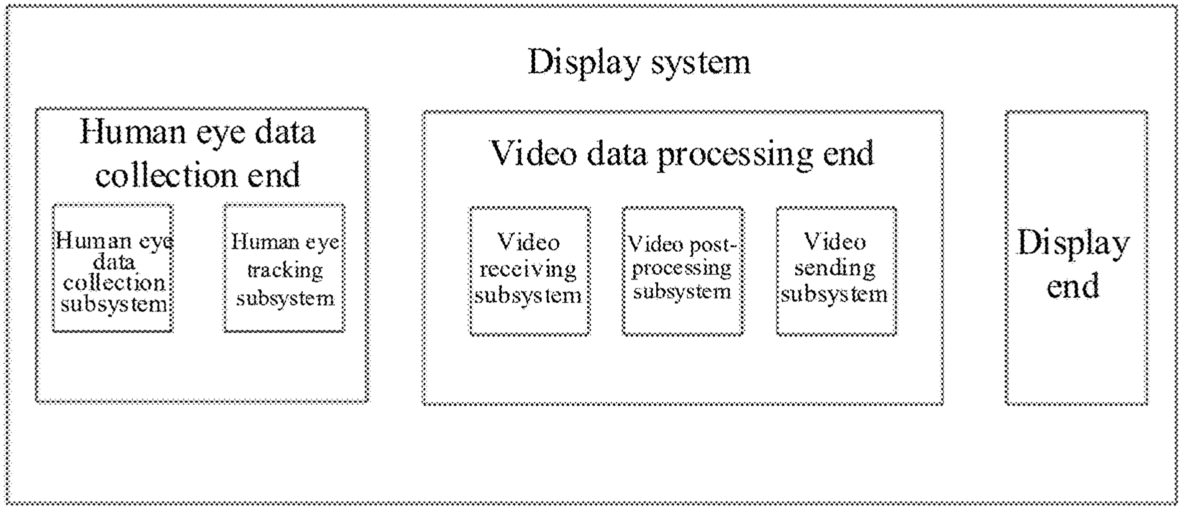
FIG. 7 schematically shows a schematic view of the structure of a display system for performing the method according to the present disclosure.

Based on the same inventive concept, an embodiment of the present disclosure provides a display system. FIG. 7 schematically shows a schematic view of the structure of a display system for performing the method according to the present disclosure, as shown in FIG. 7, the system including:

a human eye data collection end, for collecting a human eye image in response to a first trigger signal, performing human eye tracking processing based on the human eye image in response to a second trigger signal to acquire human eye coordinates;

a video data processing end, wherein the video data collection end is communicatively connected to the human eye data collection end, and is used for processing a 3D video signal based on the human eye coordinates to generate left and right eye images, and sending the left and right eye images to a display end in response to a third trigger signal;

the display end is communicatively connected to the video data processing end for receiving and displaying the left and right eye images;

Wherein at least one of the first trigger signal and the second trigger signal is generated according to the third trigger signal, and the specific generation process of the first trigger signal and the second trigger signal can be seen from the contents of step S104 in a display method applied to a video data processing end, and the embodiments of the present disclosure will not be described in detail herein.

In the disclosed embodiment, the human eye data collection end is configured with a human eye data collection subsystem and a human eye tracking subsystem, and the human eye data collection subsystem and the human eye tracking subsystem are communicatively connected. The human eye data collection subsystem is used for collecting one frame of the human eye image over a fourth time period in response to the first trigger signal at a first moment, and the difference between the first moment and the second moment is equal to the fourth time period; the human eye tracking subsystem is communicatively connected to the video data processing end, and is used for performing human eye tracking processing on one frame of the human eye image over a third time period in response to the second trigger signal at a second moment to acquire the human eye coordinates, the difference between the second moment and the third moment being equal to the third time period, and the third moment being a trigger moment of the third trigger signal.

In the embodiment of the present disclosure, the video data processing end is configured with a video receiving subsystem, a video post-processing subsystem and a video sending subsystem; the video receiving subsystem is communicatively connected to a server, and is used for acquiring the 3D video signal from the server via a video interface, and performing segmentation processing on the 3D video signal to obtain a first video signal and a second video signal; the video post-processing subsystem receives a first video signal and a second video signal acquired by a video sending subsystem, generates output time sequence information based on the first video signal, and generates the left and right eye images based on post-processing information, wherein the post-processing information includes at least one of the following: the human eye coordinates, the first video signal, the second video signal and the output time sequence information; the video sending subsystem receives the left and right eye images sent by the video post-processing subsystem, and is used for sending the left and right eye images to the display end at a third moment in response to the third trigger signal.

Specifically, based on the first video signal, the video post-processing subsystem acquires the first video data corresponding to the first video signal and time sequence information, writes the first video data into memory, and generates the output time sequence information based on the time sequence information. Subsequently, the video post-processing subsystem reads one frame of the first video data and one frame of the second video data from the memory respectively via the same time successively within the time for which the video data processing end inputs one frame of the 3D video signal, performs distribution stretching on the first video data and the second video data corresponding to the second video signal, and performs pixel rearrangement based on the human eye coordinates and the output time sequence information so as to generate the left and right eye images.

In an alternative embodiment, the video data processing end, based on the third moment, the third time period, and the fourth time period, extends the third time period and the fourth time period to time period and the fourth time period, and generates the first trigger signal in reverse, so that the first trigger signal triggers the human eye data collection subsystem to perform collection of the human eye image on the current frame at the first moment; wherein the first moment is used for characterizing the moment at which the human eye data collection subsystem completes collection of the human eye image of the previous frame.

In another alternative embodiment, the video data processing end, based on the second trigger signal and the fourth time period, extends the duration of the fourth time period at a moment before the second moment triggered by the second trigger signal and reversely generates the first trigger signal so that the first trigger signal triggers the human eye data collection subsystem to collect the human eye image of the current frame at the first moment.

In an alternative embodiment, the video data processing end, based on the third moment and the third time period, extends the duration of the third time period to the moment before the third moment, and generates the second trigger signal in reverse, so that the second trigger signal triggers the human eye tracking subsystem to acquire the human eye coordinates of the current frame at the second moment; wherein the second moment is used for characterizing the moment at which the human eye tracking subsystem completes acquisition of the human eye coordinates of the previous frame.

In an alternative embodiment, the video data processing end generates the third trigger signal based on the first time period, so that the third trigger signal triggers the video data processing end to send the left and right eye images to the display end at the third moment; wherein the first time period is used for characterizing the time for which the video data processing end inputs one frame of the 3D video signal.

In an alternative embodiment, the video data processing end determines at least one second trigger signal based on the third moment and the third time period, such that the frequency with which the human eye tracking subsystem collects the human eye image in response to the at least one second trigger signal matches the frequency with which the video data processing end acquires 3D video signals. Preferably, the human eye data collection end is provided with at least one human eye tracking subsystem to perform human eye tracking processing alternately in response to at least one path of the second trigger signal, the quantity of human eye tracking subsystems being greater than or equal to the quantity of the second trigger signals.

Figure 8:
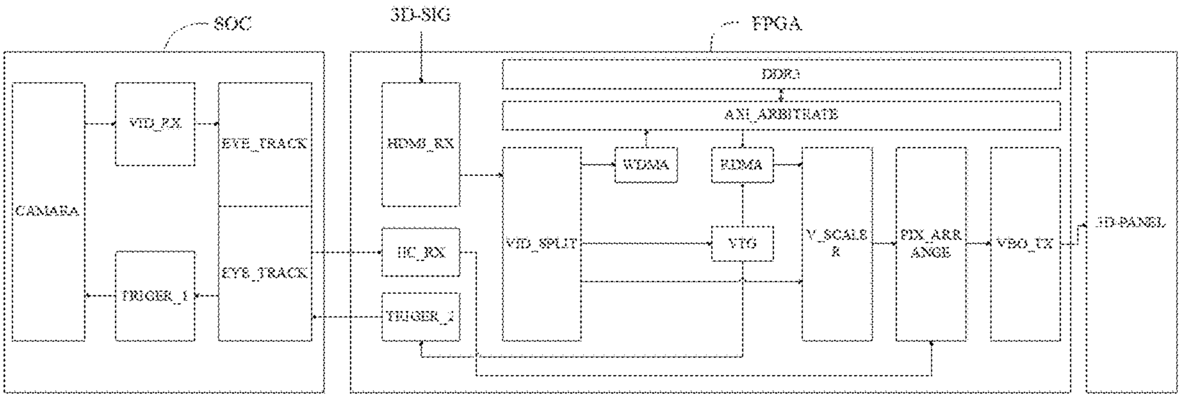
FIG. 8 schematically shows a schematic view of the structure of an example of a display system for performing the method according to the present disclosure.

In order for the person skilled in the art to more clearly understand the display system of the present disclosure, FIG. 8 schematically shows a schematic view of the structure of an example of a display system for performing the method according to the present disclosure. As shown in FIG. 8, referring to FIG. 8, the display system described in the disclosure will now be described in detail by means of the following embodiments.

- the human eye data collection end uses a SOC (System on Chip), and includes a camera as a human eye image collection subsystem and a human eye tracking subsystem; the camera establishes a connection with the human eye tracking subsystem via a USB interface; the human eye tracking subsystem establishes a connection with a video data processing end via a IIC interface (Inter-Integrated Circuit); and a human eye coordinates and a first trigger signal and a second trigger signal from a receiving video data processing end are sent to the video data processing end via the IIC interface. The human eye tracking subsystem includes a human eye tracking module (EYE_TRACK) and an image reading module (VID_RX), wherein the image reading module is used for sending the human eye image acquired by the camera to the human eye tracking module, and the human eye tracking module is used for performing human eye tracking processing on the human eye image and acquiring human eye coordinates.
- the video data processing end uses an FPGA (Field Programmable Gate Array), which includes a video receiving subsystem, a video post-processing subsystem and a video sending subsystem, wherein the video receiving subsystem includes a video receiving module (HDMI_RX) and a video segmentation module (VID_SPLIT), and the video receiving module passes through a four-way HDMI interface (High Definition Multimedia Interface) establishes a connection with a server, receives a 3D video signal (3D-SIG) transmitted by the server in an 8K4K, TOP-BOTTOM format, and transmits the 3D video signal to a video segmentation module for video segmentation pre-processing to obtain a TOP video signal and a BOTTOM video signal.
- the video post-processing subsystem includes a write memory control module (WDMA), an AXI bus arbitration module (AXI_ARBITRATE), a time sequence generation module (VTG), a read memory control module (RDMA), a memory module (DDR3), a vertical stretching module (V_SCALER) and a pixel rearrangement module (PIX_ARRANGE). A TOP video signal writes corresponding TOP video data into a memory module via a write memory control module, and inputs time sequence information into a time sequence generation module to generate output time sequence information; then, the TOP video data is read by the read memory control module, and is input into the vertical stretching module together with the BOTTOM video data, and a distribution stretched 8K left and right video data is input into a pixel rearrangement module; at the same time, the human eye coordinates from the human eye data collection end are transmitted to the pixel rearrangement module via the IIC interface (IIC_RX), and the left and right video data are pixel rearranged based on the human eye coordinates, so as to obtain left and right eye images input video sending subsystems. In addition, the time sequence generation module is used for generating a trigger signal, and the AXI bus arbitration module is used for prioritizing the access of the memory module to the write memory control module and the read memory control module according to a predetermined format. the video sending subsystem includes a video sending module (VBO_TX) for sending the received left and right eye images to a display end.
- the display end is a naked-eye 3D screen (3D-PANEL), the resolution of the naked-eye 3D screen is 8K4K, specifically 7680×4320 @60 Hz, and is connected to the video sending subsystem via a VBO interface of 32Lane, receives left and right eye images transmitted by the video sending subsystem, and displays same on the screen according to output time sequence information so that a viewer realizes a naked-eye 3D display effect when viewing the left and right eye images.

Figure 9:
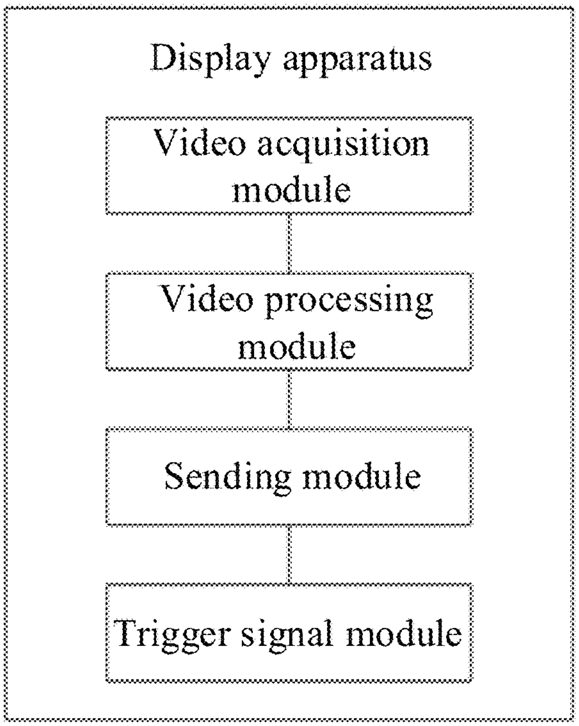
FIG. 9 schematically shows a schematic view of the structure of a display apparatus of a video data processing end for performing the method according to the present disclosure.

Based on the same inventive concept, an embodiment of the present disclosure provides a display apparatus applied to a video data processing end, and FIG. 9 schematically shows a schematic view of the structure of a display apparatus of a video data processing end for performing the method according to the present disclosure, as shown in FIG. 9, the apparatus including:

a video acquisition module, used for acquiring a 3D video signal in response to a frame start signal;

a video processing module, used for processing the 3D video signal according to human eye coordinates sent by a human eye data collection end to obtain left and right eye images;

a sending module, used for sending the left and right eye images to a display end to display the left and right eye images on the display end in response to a third trigger signal;

a trigger signal module, used for generating a first trigger signal and/or a second trigger signal according to the third trigger signal, and sending the first trigger signal and/or second trigger signal to the human eye data collection end, so that the human eye data collection end collecting a human eye image in response to the first trigger signal, and performing human eye tracking processing based on the human eye image in response to the second trigger signal to acquire the human eye coordinates.

In an alternative embodiment, the video processing module includes:

a segmentation sub-module, used for performing segmentation processing on the 3D video signal to obtain a first video signal and a second video signal, wherein one of the first video signal and the second video signal is a left-eye video signal corresponding to the 3D video signal, and the other is a right-eye video signal;

a writing sub-module, used for acquiring the first video data corresponding to the first video signal and time sequence information based on the first video signal, and writing the first video data into a memory over a fifth time period, wherein the fifth time period is half of the time that one frame of the 3D video signal is input;

a time sequence sub-module, used for generating output time sequence information based on the time sequence information, wherein the output time sequence information characterizes the output time sequence of the left and right eye images on the display end.

In an alternative embodiment, the trigger signal module includes:

a third moment sub-module, used for determining a third moment, wherein the third moment is a moment when the third trigger signal triggers the left and right eye images to be sent to the display end;

a second moment sub-module, used for acquiring a third time period, reversely delaying the third time period from the third moment, and determining a second moment, wherein the third time period is the time for the human eye data collection end to perform human eye tracking processing on one frame of human eye image;

a second trigger signal first determination sub-module, used for generating the second trigger signal based on the second moment, so that the second trigger signal triggers the human eye data collection end to acquire the human eye coordinates at the second moment.

In an alternative embodiment, the third moment sub-module includes:

a first time period unit, used for acquiring a first time period and a third time period, wherein the first time period is the time for inputting one frame of the 3D video signal;

a third moment unit, used for determining the third moment based on the first time period corresponding to the current frame, wherein the third moment is a midpoint moment of the first time period.

In an alternative embodiment, the trigger signal module further includes:

a fourth time period sub-module, used for acquiring a fourth time period, wherein the fourth time period is the time for the human eye data collection end to collect one frame of the human eye image;

a first moment first determination sub-module, used for reversely delaying the fourth time period from the second moment to determine a first moment;

a first trigger signal first determination sub-module, used for generating the first trigger signal based on the first moment, so that the first trigger signal triggers the human eye data collection end to collect the human eye image of the current frame at the first moment.

In an alternative embodiment, the trigger signal module further includes:

a fourth time period sub-module, used for acquiring a fourth time period, wherein the fourth time period is the time for the human eye data collection end to collect one frame of the human eye image;

a fourth moment sub-module, used for determining a fourth moment based on the third time period, wherein the fourth moment is the moment at which the human eye data collection end completes human eye tracking processing on the previous frame of the human eye image;

a first moment second determination sub-module, used for forward delaying a difference period of the third time period and the fourth time period from the fourth moment to determine a first moment;

a first trigger signal sub-second determination sub-module, used for generating the first trigger signal based on the first moment, so that the first trigger signal triggers the human eye data collection end to collect the human eye image of the current frame at the first moment.

In an alternative embodiment, the trigger signal module further includes:

a first quantity sub-module, used for determining a first quantity based on the first time period and the third time period;

a second trigger signal second determination sub-module, used for generating the first quantity of second trigger signals at the second moment, so that the frequency of acquiring the human eye coordinates in response to the first quantity of second trigger signals matches the frequency of acquiring a 3D video signal;

a sending sub-module, used for sending the first quantity of second trigger signals successively to a second quantity of human eye tracking subsystems in the human eye data collection end, wherein the second quantity is greater than or equal to the first quantity.

In an alternative embodiment, the first quantity of sub-modules includes:

a calculation unit, used for calculating a ratio of the third time period to the first time period, and rounding up the ratio to obtain the first quantity.

In an alternative embodiment, the video processing module further includes:

a second video data sub-module, used for acquiring second video data based on the second video signal;

a reading sub-module, used for reading the first video data from the memory, performing distribution stretching on the first video data and the second video data to obtain left and right video data, wherein the resolution of the left and right video data is the same as that of the 3D video signal;

a pixel rearrangement sub-module, used for performing, in response to the human eye coordinates sent by the human eye data collection end, pixel rearrangement on the left and right video data based on the human eye coordinates and the output time sequence information, and generating the left and right eye images.

In an alternative embodiment, the reading sub-module includes:

a first video reading unit, used for reading, after the first video data is completely written, the first video data over a sixth time period, the sixth time period having the same duration as the fifth time period;

a distribution stretching unit, used for performing distribution stretching on the first video data and the second video data to obtain the left and right video data.

Figure 10:
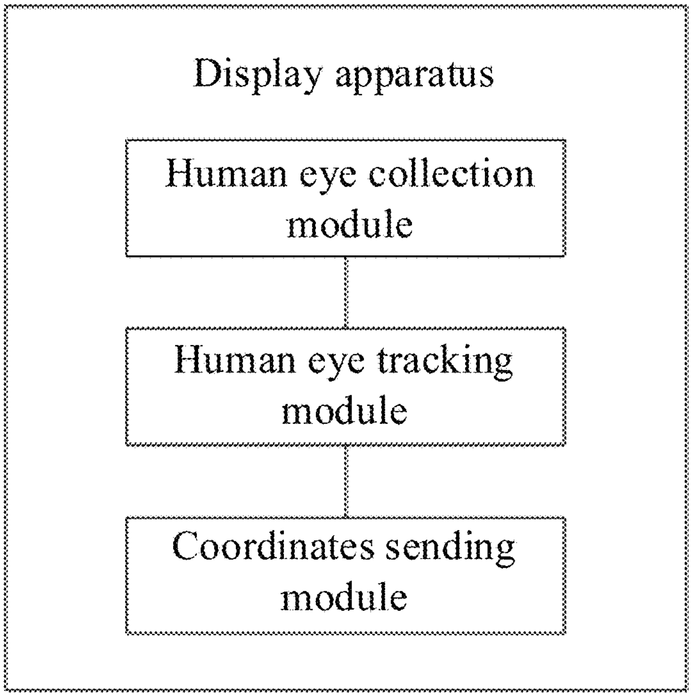
FIG. 10 schematically shows a schematic view of the structure of a display apparatus of a human eye data collection end for performing the method according to the present disclosure.

Based on the same inventive concept, an embodiment of the present disclosure provides a display apparatus applied to a human eye data collection end, and FIG. 10 schematically shows a schematic view of the structure of a display apparatus of a human eye data collection end for performing the method according to the present disclosure, as shown in FIG. 10, the apparatus including:

a human eye collection module, used for collecting a human eye image in response to a first trigger signal sent by a video data processing end;

a human eye tracking module, used for performing human eye tracking processing on the human eye image in response to a second trigger signal sent by the video data processing end to acquire human eye coordinates;

coordinates sending module, used for sending the human eye coordinates to the video data processing end, so that the video data processing end processes a 3D video signal based on the human eye coordinates to generate left and right eye images, and sending the left and right eye images to a display end in response to a third trigger signal, wherein the first trigger signal and/or the second trigger signal are/is generated according to the third trigger signal.

In an alternative embodiment, the human eye collection module includes:

a first receiving sub-module, used for receiving the first trigger signal sent by the video data processing end;

a first trigger sub-module, used for controlling, in response to the first trigger signal at a first moment, an image collection apparatus to collect one frame of the human eye image over a fourth time period.

In an alternative embodiment, the human eye tracking module includes:

a second receiving sub-module, used for receiving the second trigger signal sent by the video data processing end;

a second trigger sub-module, used for performing human eye tracking processing on one frame of the human eye image over a third time period in response to the second trigger signal at a second moment to acquire the human eye coordinates.

In an alternative embodiment, the second receiving sub-module includes:

a second receiving unit, used for receiving a first quantity of the second trigger signals successively sent by the video data processing end within the third time period, wherein the second quantity is greater than or equal to the first quantity;

a human eye tracking unit, used for controlling, in response to each of the second trigger signals, the human eye tracking subsystem to perform human eye tracking processing on the human eye image so that each of the second trigger signals newly received triggers the human eye tracking subsystem which has not triggered within the third time period.

The described device embodiments above are merely illustrative. The units described as separate components may or may not be physically separated, and the components displayed as units may or may not be physical units; they could be located in one place or distributed across multiple network units. Partial or complete modules can be selected as needed to implement the purpose of this embodiment. Those skilled in the art can understand and implement without exercising inventive labor.

Various embodiments disclosed herein may be implemented in hardware, software modules running on one or more processors, or their combination. It should be understood by those skilled in the art that microprocessors or digital signal processors (DSPs) can be used in practice to implement some or all functions of some or all components in the computing processing device according to the embodiments disclosed herein. The disclosure can also be implemented as devices or device programs (e.g., computer programs and computer program products) for executing some or all of the methods described herein. Such implementations of the disclosed program may be stored on computer-readable media or may take the form of one or more signals. Such signals may be downloaded from internet websites, provided on carrier signals, or provided in any other form.

Figure 11:
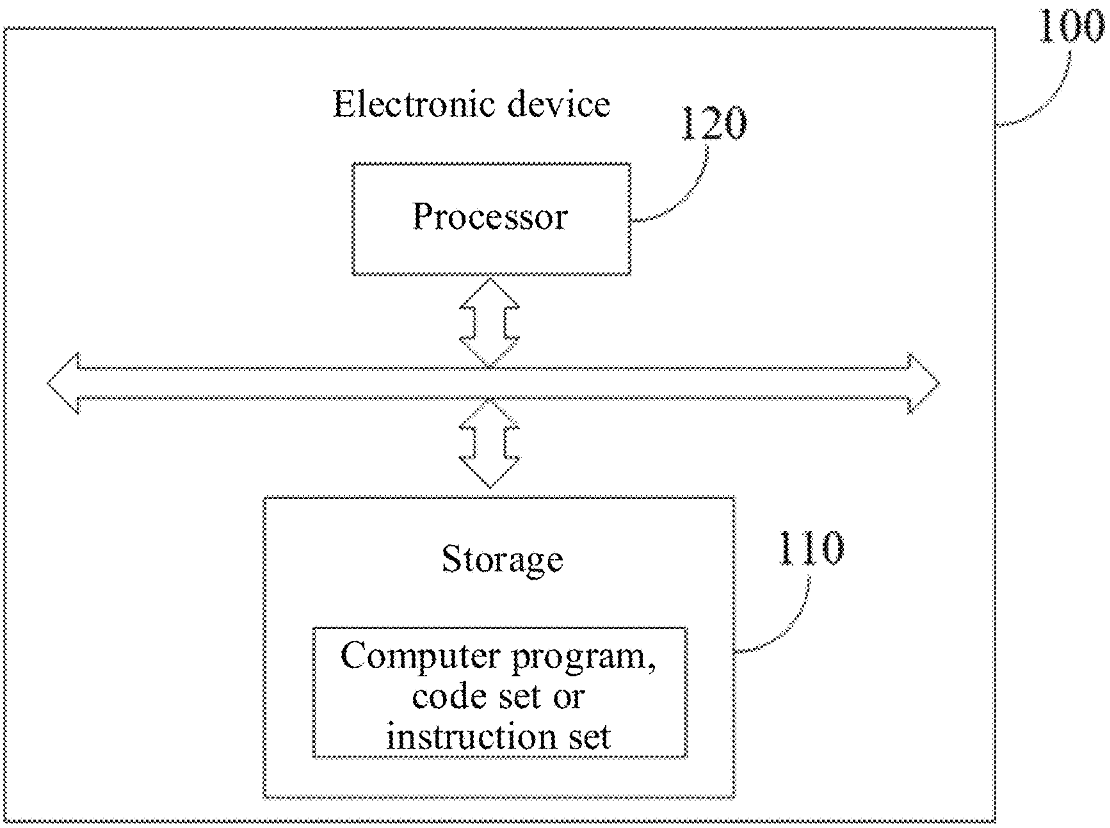
FIG. 11 schematically shows a schematic view of the structure of a computing processing device for performing the method according to the present disclosure.

For example, FIG. 11 schematically illustrates the structure of a computing processing device 100 for executing the method according to the present disclosure. As shown in FIG. 11, the computing processing device 100 traditionally includes a processor 120 and a computer program product or computer-readable medium in the form of memory 110. The memory 110 may be electronic storage such as flash memory, EEPROM, EPROM, hard disk, or ROM. The memory 110 has storage space for program code to execute any method steps described above. For example, the storage space for program code may include various program codes for implementing various steps in the method described above. These program codes can be read from or written to one or more computer program products. These computer program products include program code carriers such as hard disks, compact discs (CDs), memory cards, or floppy disks. Such computer program products are typically portable or fixed storage units. The storage unit may have storage segments, storage spaces, or similar arrangements similar to the memory 110 in the computing processing device 100 of FIG. 11. The program code may be compressed appropriately. Typically, the storage unit includes computer-readable code that can be read by a processor such as processor 120, which, when executed by the computing processing device, causes the computing processing device to perform the various steps described above.

The term “an embodiment”, “an example”, or “one or more embodiments” as used herein means that specific features, structures, or characteristics described in conjunction with the embodiments are included in at least one embodiment disclosed herein. Furthermore, please note that the phrase "in one embodiment" or "in an embodiment" used herein does not necessarily refer to the same embodiment.

The detailed description provided herein includes a large number of specific details. However, it can be understood that the embodiments of the present disclosure can be practiced without these specific details. In some instances, well-known methods, structures, and techniques have not been described in detail to avoid obscuring the understanding of this specification.

In the claims, any reference symbols placed between parentheses should not be construed as limiting the claims. The word "comprising" does not exclude the presence of elements or steps not listed in the claims. The use of the words "a" or "an" preceding an element does not exclude the presence of multiple such elements. The present disclosure may be implemented with hardware comprising several different components and with the aid of a suitably programmed computer. In claims enumerating several units of a device, several of these units may be embodied by the same hardware item. The use of the words first, second, and third, etc., does not imply any ordering. These words may be interpreted as names.

Finally, it should be noted that the above embodiments are only used to illustrate the technical solutions of the present disclosure, not to limit them; although detailed descriptions of the above embodiments have been provided, those skilled in the art should understand that they can still modify the technical solutions recorded in the above embodiments, or equivalently replace some technical features. These modifications or replacements do not depart from the spirit and scope of the technical solutions of the embodiments disclosed herein.

The invention claimed is:

1. A display method, applied to a video data processing end, comprising:

acquiring a 3D video signal in response to a frame start signal;

processing the 3D video signal according to human eye coordinates sent by a human eye data collection end to obtain left and right eye images;

sending the left and right eye images to a display end to display the left and right eye images on the display end in response to a third trigger signal; and generating a first trigger signal and/or a second trigger signal according to the third trigger signal, and sending the first trigger signal and/or second trigger signal to the human eye data collection end, so that the human eye data collection end collecting a human eye image in response to the first trigger signal, and performing human eye tracking processing based on the human eye image in response to the second trigger signal to acquire the human eye coordinates, wherein, before processing the 3D video signal, the method further comprises:

performing segmentation processing on the 3D video signal to obtain a first video signal and a second video signal, wherein one of the first video signal and the second video signal is a left-eye video signal corresponding to the 3D video signal, and the other is a right-eye video signal;

acquiring first video data corresponding to the first video signal and time sequence information based on the first video signal, and writing the first video data into a memory over a fifth time period, wherein the fifth time period is half of the time that one frame of the 3D video signal is input; and generating output time sequence information based on the time sequence information, wherein the output time sequence information characterizes the output time sequence of the left and right eye images on the display end.

2. A display method, applied to a video data processing end, comprising:

acquiring a 3D video signal in response to a frame start signal;

processing the 3D video signal according to human eye coordinates sent by a human eye data collection end to obtain left and right eye images;

sending the left and right eye images to a display end to display the left and right eye images on the display end in response to a third trigger signal; and generating a first trigger signal and/or a second trigger signal according to the third trigger signal, and sending the first trigger signal and/or second trigger signal to the human eye data collection end, so that the human eye data collection end collecting a human eye image in response to the first trigger signal, and performing human eye tracking processing based on the human eye image in response to the second trigger signal to acquire the human eye coordinates, wherein generating the second trigger signal according to the third trigger signal comprises:

determining a third moment, wherein the third moment is a moment when the third trigger signal triggers the left and right eye images to be sent to the display end;

acquiring a third time period, reversely delaying the third time period from the third moment, and determining a second moment, wherein the third time period is the time for the human eye data collection end to perform human eye tracking processing on one frame of the human eye image; and generating the second trigger signal based on the second moment, so that the second trigger signal triggers the human eye data collection end to acquire the human eye coordinates at the second moment.

3. The display method according to claim 1, wherein determining the third moment comprises:

acquiring a first time period, wherein the first time period is the time for inputting one frame of the 3D video signal; and determining the third moment based on the first time period corresponding to the current frame, wherein the third moment is a midpoint moment of the first time period.

4. The display method according to claim 1, wherein generating the first trigger signal according to the third trigger signal comprises:

acquiring a fourth time period, wherein the fourth time period is the time for the human eye data collection end to collect one frame of the human eye image;

reversely delaying the fourth time period from the second moment to determine a first moment; and generating the first trigger signal based on the first moment, so that the first trigger signal triggers the human eye data collection end to collect the human eye image of the current frame at the first moment.

5. The display method according to claim 1, wherein generating the first trigger signal according to the third trigger signal comprises:

acquiring a fourth time period, wherein the fourth time period is the time for the human eye data collection end to collect one frame of the human eye image;

determining a fourth moment based on the third time period, wherein the fourth moment is the moment at which the human eye data collection end completes human eye tracking processing on the previous frame of the human eye image;

forward delaying a difference period of the third time period and the fourth time period from the fourth moment to determine a first moment; and generating the first trigger signal based on the first moment, so that the first trigger signal triggers the human eye data collection end to collect the human eye image of the current frame at the first moment.

6. The display method according to claim 3, wherein generating the second trigger signal according to the third trigger signal and sending the second trigger signal to the human eye data collection end comprises:

determining a first quantity based on the first time period and the third time period;

generating the first quantity of second trigger signals at the second moment, so that the frequency of acquiring the human eye coordinates in response to the first quantity of second trigger signals matches the frequency of acquiring a 3D video signal; and sending the first quantity of second trigger signals successively to a second quantity of human eye tracking subsystems in the human eye data collection end, wherein the second quantity is greater than or equal to the first quantity.

7. The display method according to claim 6, wherein determining the first quantity based on the first time period and the third time period comprises calculating a ratio of the third time period to the first time period, and rounding up the ratio to obtain the first quantity.

8. The display method according to claim 1, wherein processing the 3D video signal according to the human eye coordinates sent by the human eye data collection end comprises:

acquiring second video data based on the second video signal;

reading the first video data from the memory, and performing distribution stretching on the first video data and the second video data to obtain left and right video data, wherein a resolution of the left and right video data is the same as that of the 3D video signal; and in response to the human eye coordinates sent by the human eye data collection end, performing pixel rearrangement on the left and right video data based on the human eye coordinates and the output time sequence information and generating the left and right eye images.

9. The display method according to claim 8, wherein reading the first video data from the memory, and performing distribution stretching on the first video data and the second video data to obtain the left and right video data comprises:

after the first video data is completely written, reading the first video data over a sixth time period, the sixth time period having the same duration as the fifth time period; and performing distribution stretching on the first video data and the second video data to obtain the left and right video data.

10. A display method, applied to a human eye data collection end, comprising:

collecting a human eye image in response to a first trigger signal sent by a video data processing end;

performing human eye tracking processing on the human eye image in response to a second trigger signal sent by the video data processing end to acquire human eye coordinates; and sending the human eye coordinates to the video data processing end so that the video data processing end processes a 3D video signal based on the human eye coordinates to generate left and right eye images, and sending the left and right eye images to a display end in response to a third trigger signal, wherein the first trigger signal and/or the second trigger signal are/is generated according to the third trigger signal, wherein collecting the human eye image in response to the first trigger signal sent by the video data processing end comprises:

receiving the first trigger signal sent by the video data processing end; and controlling an image collection apparatus to collect one frame of the human eye image over a fourth time period in response to the first trigger signal at a first moment, and wherein performing human eye tracking processing on the human eye image in response to a second trigger signal sent by the video data processing end to acquire human eye coordinates, comprises:

receiving the second trigger signal sent by the video data processing end; and performing human eye tracking processing on one frame of the human eye image over a third time period in response to the second trigger signal at a second moment to acquire the human eye coordinates.

11. The display method according to claim 10, wherein the human eye data collection end comprises a second quantity of human eye tracking subsystems, and receiving the second trigger signal sent by the video data processing end comprises:

receiving a first quantity of the second trigger signals successively sent by the video data processing end within the third time period, wherein the second quantity is greater than or equal to the first quantity; and controlling the eye tracking subsystem to perform human eye tracking processing on the human eye image in response to each of the second trigger signals such that each of the newly received second trigger signals triggers the human eye tracking subsystem that has not triggered within the third time period.

* * * * *